United States Patent
Majumder

(10) Patent No.: US 9,077,200 B2
(45) Date of Patent: Jul. 7, 2015

(54) ENHANCING WIDE AREA CONTROL RELIABILITY OF A POWER TRANSMISSION SYSTEM

(71) Applicant: Rajat Majumder, Cary, NC (US)

(72) Inventor: Rajat Majumder, Cary, NC (US)

(73) Assignee: ABB Research Ltd. (CH)

( * ) Notice: Subject to any disclaimer, the term of this patent is extended or adjusted under 35 U.S.C. 154(b) by 473 days.

(21) Appl. No.: 13/621,620

(22) Filed: Sep. 17, 2012

(65) Prior Publication Data

US 2013/0018515 A1 Jan. 17, 2013

Related U.S. Application Data

(63) Continuation of application No. PCT/EP2010/053458, filed on Mar. 17, 2010.

(51) Int. Cl.
*G01R 21/00* (2006.01)
*H02J 3/00* (2006.01)
*H02J 3/06* (2006.01)
(Continued)

(52) U.S. Cl.
CPC ... *H02J 3/06* (2013.01); *H02J 3/24* (2013.01); *H02J 13/0006* (2013.01)

(58) Field of Classification Search
CPC ... H04W 52/08; H04W 52/24; H04W 52/346; H02J 2003/007; H02J 3/06; H02P 9/105; Y02E 60/728; Y04S 10/265; G06F 1/28; H04B 1/7107
USPC ........... 700/286, 292; 702/57, 60; 307/11, 43; 370/318, 328, 338; 455/127.1, 522
See application file for complete search history.

(56) References Cited

U.S. PATENT DOCUMENTS 6,961,362 B2 * 11/2005 Ariyoshi et al. .............. 375/130
7,149,637 B2    12/2006 Korba et al.
7,920,889 B2 *  4/2011 Hoshino et al. .............. 455/522
(Continued)

FOREIGN PATENT DOCUMENTS

| EP | 1737098 A1 | 12/2006 |
|---|---|---|
| EP | 2124311 A1 | 11/2009 |
| WO | WO 2011113485 A1 * | 9/2011 |

OTHER PUBLICATIONS

"Application of FACTS Devices for Damping of Power System Oscillations", by R. Sadikovic et al., proceedings of the Power Tech conference 2005, Jun. 27-30, St. Petersburg RU.
(Continued)

*Primary Examiner* — Crystal J Barnes-Bullock
(74) *Attorney, Agent, or Firm* — Whitmyer IP Group LLC

(57) ABSTRACT

A method, arrangement and computer program product for enhancing the reliability of wide area control in a power transmission system where the wide area control is performed in the power transmission system based on measurements of system data. The arrangement includes an estimating unit configured to generate estimated measurement values based on at least one control signal being sent into the system and a model of the system, where the estimated measurement values correspond to a set of actual measurement values that are provided by a number of measurement providing devices in the system. The arrangement also includes a control unit configured to replace, if one or more deviation condition associated with at least one actual measurement value is fulfilled, at least the actual measurement values of the set being associated with the one or more deviation condition with corresponding estimated measurement values.

17 Claims, 5 Drawing Sheets

(51) Int. Cl.
*H02J 3/24* (2006.01)
*H02J 13/00* (2006.01)

(56) References Cited

U.S. PATENT DOCUMENTS

| | | | |
|---|---|---|---|
| 7,979,220 B2* | 7/2011 | Scholtz et al. | 702/60 |
| 8,190,379 B2* | 5/2012 | Rehtanz et al. | 702/57 |
| 8,320,307 B2* | 11/2012 | Niwano | 370/329 |
| 2008/0189061 A1 | 8/2008 | Scholtz et al. | |
| 2011/0093124 A1* | 4/2011 | Berggren et al. | 700/286 |
| 2012/0239198 A1* | 9/2012 | Orita et al. | 700/260 |
| 2013/0031385 A1* | 1/2013 | Seto | 713/300 |

OTHER PUBLICATIONS

"Damping Controller Input-Signal Loss Effects on the Wide-Area Stability of an Interconnected Power System", by Mekki et al in: Power Engineering Society Summer Meeting, 2000. IEEE, p. 1015-1019, vol. 2.

"Opportunities in Wide Area Control and Measurements (WACAM)" by Ghosh and Ledwich, Australasian Universities Power Engineering Conference AUPEC 2006, Dec. 10-13, 2006; 7 pages.

"Some Viewpoints and Experiences on Wide Area Measurement Systems and Wide Area Control Systems" by Xue, Power and Energy Society General Meeting—Conversion and Delivery of Electrical Energy in the 21st Century, 2008 IEEE, Jul. 20-24, 2008, p. 1-6.

Meliopoulos, et al.; "A New Out-Of-Step Protection Scheme Via GPS-Synchronized Data"; Conference Proceedings 16th Power Systems Computation Conference (PSCC); Jul. 14-18, 2008; pp. 1-7.

Zuo, et al.; "Development of TVA SuperPDC: Phasor Application, Tools, and Event Replay"; IEEE; Jul. 20, 2008; pp. 1-8.

International Preliminary Report on Patentability Application No. PCT/EP2010/053458 Date: Jul. 12, 2012 16 pages.

International Search Report and Written Opinion of the International Searching Authority; Application No. PCT/EP2010/053458 Completed: Jan. 10, 2011; Mailing Date: Jan. 24, 2011 12 pages.

Sheng, et al.; "Secondary Voltage Regulation Based on Wide Area Network"; IEEE; Jul. 26, 2009; pp. 1-7.

Taylor, et al.; "WACS—Wide-Area Stability and Voltage Control System: R&D and Online Demonstration"; IEEE; May 2005; pp. 892-906.

"Towards Real-time Implementation of Adaptive Damping Controllers for FACTS Devices" by P. Korba, M. Larsson, B. Chaudhuri, B. Pal, R. Majumder, R. Sadikovic and G. Andersson in IEEE Power Engineering Society General Meeting, 2007; 6 pages.

"Wide-Area Monitoring and Control for Power System Grid Security", by Avila-Rosales and Giri, 15th Power Systems Computation Conference Proc, 2005; pp. 1-7.

\* cited by examiner

| 42 | t | CS | EMQ1 | EMQ2 | ... | EMQn |
|---|---|---|---|---|---|---|
| | $t_1$ | $u_1$ | $y'_{11}$ | $y'_{21}$ | ... | $y'_{n1}$ |
| | $t_2$ | $u_2$ | $y'_{12}$ | $y'_{22}$ | ... | $y'_{n2}$ |
| | ⋮ | | | | | |
| | $t_m$ | $u_m$ | $y'_{1m}$ | $y'_{2m}$ | ... | $y'_{nm}$ |

FIG. 4

| t | CS1 | CS2 | ... | CSp | EMQ1 | EMQ2 | ... | EMQn |
|---|---|---|---|---|---|---|---|---|
| $t_1$ | $u_{11}$ | $u_{21}$ | ... | $u_{p1}$ | $y'_{11}$ | $y'_{21}$ | ... | $y'_{n1}$ |
| $t_2$ | $u_{12}$ | $u_{22}$ | ... | $u_{p2}$ | $y'_{12}$ | $y'_{22}$ | ... | $y'_{n2}$ |
| ⋮ | | | | | | | | |
| $t_m$ | $u_{1m}$ | $u_{2m}$ | ... | $u_{pm}$ | $y'_{1m}$ | $y'_{2m}$ | ... | $y'_{nm}$ |

ENHANCING WIDE AREA CONTROL RELIABILITY OF A POWER TRANSMISSION SYSTEM

FIELD OF THE INVENTION

The invention relates to the field of wide area control of an electric power transmission system. The invention more particularly concerns a method, arrangement and computer program product for enhancing the reliability of wide area control in a power transmission system.

BACKGROUND OF THE INVENTION

In the wake of the ongoing deregulations of the electric power markets, load transmission and wheeling of power from distant generators to local consumers has become common practice. As a consequence of the competition between power producing companies and the emerging need to optimize assets, increased amounts of electric power are transmitted through the existing networks, frequently causing congestions due to transmission bottlenecks. Transmission bottlenecks are typically handled by introducing transfer limits on transmission interfaces. This improves system security.

However it also implies that more costly power production has to be connected while less costly production is disconnected from a power grid. Thus, transmission bottlenecks have a substantial cost to the society. If transfer limits are not respected, system security is degraded which may imply disconnection of a large number of customers or even complete blackouts in the event of credible contingencies.

The underlying physical cause of transmission bottlenecks is often related to the dynamics of the power system. A number of dynamic phenomena need to be avoided in order to certify sufficiently secure system operation, such as loss of synchronism, voltage collapse and growing electromechanical oscillations. In this regard, electrical power transmission systems are highly dynamic and require control and feedback to improve performance and increase transfer limits.

For instance in relation to unwanted electromechanical oscillations that occur in parts of the power transmission system, these oscillations generally have a frequency of less than a few Hz and are considered acceptable as long as they decay fast enough. They are initiated by e.g. normal changes in the system load or switching events in the network possibly following faults, and they are a characteristic of any power system. The above mentioned oscillations are also often called Inter-area modes of oscillation since they are typically caused by a group of machines in one geographical area of the system swinging against a group of machines in another geographical area of the system. Insufficiently damped oscillations may occur when the operating point of the power transmission system is changed, for example, due to a new distribution of power flows following a connection or disconnection of generators, loads and/or transmission lines. In these cases, an increase in the transmitted power of a few MW may make the difference between stable oscillations and unstable oscillations which have the potential to cause a system collapse or result in loss of synchronism, loss of interconnections and ultimately the inability to supply electric power to the customer. Appropriate monitoring and control of the power transmission system can help a network operator to accurately assess power transmission system states and avoid a total blackout by taking appropriate actions such as the connection of specially designed oscillation damping equipment.

It is known to dampen such interarea mode oscillations. Power oscillation damping is for instance described in "Application of FACTS Devices for Damping of Power System Oscillations", by R. Sadikovic et al., proceedings of the Power Tech conference 2005, Jun. 27-30, St. Petersburg RU.

Damping may be based on local measurements of system properties, i.e. on system properties measured close to the location where the required damping is determined and also performed or be based on measurements in various areas of the system. The first type of damping is often denoted local power oscillation damping, while the latter case is normally termed wide area power oscillation damping.

The latter type of damping is in many ways preferred, since it considers the system performance globally and not locally. The measurements are in this case often collected using phasor measurement units (PMUs). However, since the measurements are collected from various areas of such a system, they may travel a long way before they reach a power oscillation damping unit where the wide area power oscillation damping is performed or controlled.

Because of this the measurement may be subject to delays in reaching the control equipment. This can be serious, because if the delay is too long it is possible that it may in some situations no longer be possible to dampen oscillations based on these measurements. Delay is furthermore only one type of deviation of a measurement that may have a negative influence on the damping. It can for instance also be faulty.

Most systems where power oscillations damping is performed also use a phasor data concentrator (PDC), which collects measurements and aligns them in time with each other and then forwards the aligned measurement according to the time of generation to the power oscillation damping unit. In doing this a PDC typically waits until all collected measurement values have been received that have a common time of generation, often in the form of a time stamp showing the time of generation. When all such time aligned measurements are received, the PDC then forwards them to the power oscillation damping unit. However, this means that if one measurement is delayed all will be delayed. This may therefore stop effective power oscillations damping.

There is therefore a need for enhancing the reliability of the control of power transmission systems and especially for improving power oscillation damping.

There exist some prior art in relation to power oscillation damping.

The article "Damping Controller Input-Signal Loss Effects on the Wide-Area Stability of an Interconnected Power System", by Mekki et al in: Power Engineering Society Summer Meeting, 2000. IEEE, page 1015-1019, vol. 2, discusses the replacing of remote measurement signals in a Wide Area Control System with local measurements.

The article "Opportunities in Wide Area Control and Measurements (WACAM)" by Ghosh and Ledwich, Australasian Universities Power Engineering Conference AUPEC 2006, 10th-13 Dec. 2006, Melbourne, Victoria, Australia discusses using redundant remote measurements in a control design. Here a control parameter set is selected based on detection of a lost remote signal.

The article "Some Viewpoints and Experiences on Wide Area Measurement Systems and Wide Area Control Systems" by Xue, Power and Energy Society General Meeting—Conversion and Delivery of Electrical Energy in the 21st Century, 2008 IEEE, 20-24 Jul. 2008, page 1-6 discusses providing a unified information platform where monitoring systems and simulation systems are placed. Capability to analyze and control against blackouts is described as enhanced by using knowledge of extraction from PMU data and simulation results.

U.S. Pat. No. 7,149,637 discusses detection of oscillations and estimation of their parameters using a linear model.

The article "Wide-Area Monitoring and Control for Power System Grid Security", by Avila-Rosales and Giri, 15th Power Systems Computation Conference Proc, 2005 discusses collecting PMU measurements with a PDC and using the measurements in an Energy Management System (EMS) application for predicting control actions.

PDCs are further known to be used in other areas than for control in a power transmission system. In US2008/0189061 PMUs and PDCs are used for calculating the sag of a power line.

However, none of these documents provide a solution to the above-mentioned problem. There is therefore still a need for improving reliability when performing power oscillations damping.

The present invention is therefore directed towards enhancing the reliability of the control of power transmission systems and especially for enhancing the reliability of power oscillation damping in a power transmission system.

SUMMARY OF THE INVENTION

It is therefore an objective of the invention to improve the reliability when controlling a power transmission system. This objective may be achieved by a method and an arrangement for enhancing the reliability of wide area control in a power transmission system and a computer program product. Further preferred embodiments are also evident.

According to a first aspect of the invention, a method is provided for enhancing the reliability of wide area control in a power transmission system, where the wide area control is being performed in the power transmission system based on measurements of system data. The method comprises the steps of:
   obtaining a set of actual measurement values from measurements made in the power transmission system,
   generating estimated measurement values corresponding to the actual measurement values of the set based on at least one control signal being sent into the system and a model of the system, and
   if one or more deviation condition associated with at least one actual measurement value is fulfilled, replacing at least the actual measurement values of the set being associated with the one or more deviation condition with corresponding estimated measurement values.

According to a second aspect of the present invention an arrangement for enhancing the reliability of wide area control in a power transmission system is provided, where the wide area control is being performed in the power transmission system based on measurements of system data. The arrangement comprises
   an estimating unit configured to generate estimated measurement values based on at least one control signal being sent into the system and a model of the system, where the estimated measurement values correspond to a set of actual measurement values that are provided by a number of measurement providing devices in the system, and
   a control unit configured to replace, if one or more deviation condition associated with at least one actual measurement value is fulfilled, at least the actual measurement values of the set that are associated with the one or more deviation condition with corresponding estimated measurement values.

According to a third aspect of the present invention there is provided a computer program for enhancing the reliability of wide area control in a power transmission system, where the wide area control is being performed in the power transmission system based on measurements of system data. The computer program is loadable into one or more internal memory of one or more computer and comprises computer program code means to make the one or more computer, when the program is loaded in the one or more internal memory,
   generate estimated measurement values based on at least one control signal being sent into the system and a model of the system, where the estimated measurement values correspond to a set of actual measurement values that are provided by a number of measurement providing devices in the system, and
   replace, if one or more deviation condition associated with at least one actual measurement value is fulfilled, at least the actual measurement values of the set being associated with the one or more deviation condition with corresponding estimated measurement values.

A deviation of a measurement value is here the deviation of an aspect of the measurement value in some respect from what is expected, which aspect can be related to the content of the measurement value, like level or type. However it can also be related to the behavior, like time behavior such as delay. A deviation condition is then fulfilled if an aspect of the measurement value deviates from what is desirable in too high a degree.

The invention according to these aspects has the advantage of allowing continued use of wide area power oscillation damping even though one or more actual measurement values fulfill deviation conditions for which other types of control would normally be required, like a switch-over to local power oscillation damping or an aborting of power oscillation damping. This therefore increases the reliability of control such as wide area power oscillation damping. Since a model is used that may closely resemble the actual system, it is furthermore possible that the control performed will be very close to normal control. The invention can furthermore be implemented with only a slight modification of the devices involved, which modification may mainly involve a change of software.

In one variation of the invention the system model is also tuned, which tuning may be performed by the estimating unit. The tuning may furthermore only be performed when no deviation conditions are fulfilled.

In another variation of the invention the actual measurement values are obtained at a first rate and the system model is tuned at a second lower rate, where the first rate may be ten times higher than the second rate.

According to another variation of the invention, one deviation condition may be fulfilled for an actual measurement value if it has a time delay through the system that exceeds a time delay threshold. This time delay may at least depend on the difference between the time of generation of the actual measurement value and the time at which the actual measurement value is received by the measurement aligning unit of the system.

It is furthermore possible that an investigation is made of if any deviation condition associated with the actual measurement values of the set is fulfilled. This investigation can be performed by the control unit. It can also be performed by the measurement aligning unit.

According to another variation the model includes a set of equations including functions identifying relationships between system states, control signals and estimated measurement values. These functions can be linear or non-linear functions.

BRIEF DESCRIPTION OF THE DRAWINGS

The subject matter of the invention will be explained in more detail in the following text with reference being made to preferred exemplary embodiments which are illustrated in the attached drawings, of which:

FIG. 4 schematically shows data used in a model of the power transmission system according to the first embodiment of the invention;

FIG. 7 schematically shows data used in a model of the power transmission system according to the second embodiment of the invention.

DETAILED DESCRIPTION OF THE INVENTION

Figure 1:
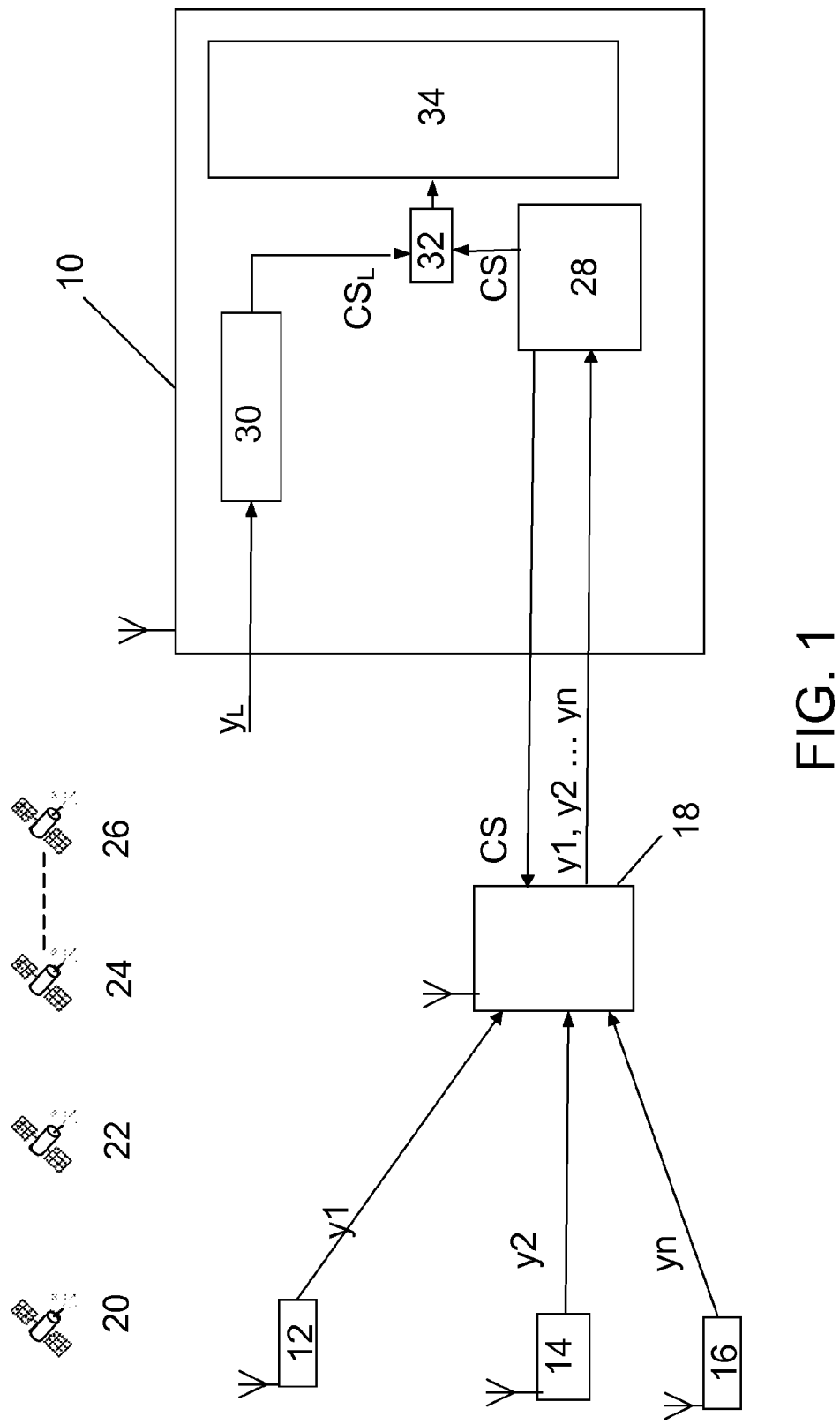
FIG. 1 schematically shows a number of measurement providing devices in a power transmission system being connected to a power control device via a measurement aligning device, which measurement aligning device is an arrangement for enhancing reliability according to a first embodiment of the invention.

FIG. 1 schematically shows a power transmissions system in which a arrangement according to a first embodiment of the invention is provided. The power transmission system is preferably an AC power transmission system and then operating at a network frequency such as 50 or 60 Hz.

The power transmission system may be provided in a number of geographical areas. These areas are typically provided on great distances from each other, where one may as an example be provided in the south of Finland and another in the south of Norway. A geographical area can be considered as a coherent area. A coherent area is an area where a group of electrical machines, such as synchronous generators, are moving coherently, i.e. they are oscillating together. Such an area may also be considered as an electrical area, because the machines are close to each other in an electrical sense. In these geographical areas there are high-voltage tie lines for connecting geographically separated regions, medium-voltage lines, substations for transforming voltages and switching connections between lines as well as various buses in the local areas. Measurement devices are furthermore connected to such power lines and buses, for instance in the form of voltage and/or current transformers. The measurement devices may here be connected to measurement providing devices 12, 14 and 16 that may be Phasor Measurement Units (PMU). A PMU provides time-stamped local data about the system, i.e. system data and in particular currents and voltage phasors. A plurality of phasor measurements collected throughout the system by PMUs and processed centrally can therefore provide a snapshot of the overall electrical state of the power transmission system. Such PMUs are normally also equipped with GPS clocks that synchronize themselves with reference clock devices in the form of GPS satellites 20, 22, 24 and 26 and will send measurement values, often in the form of phasors, such as positive sequence phasors, at equidistant points in time, e.g. every 20 ms. These measurements include measurement values of phasors that are time stamped, with time stamps representing the point in time when the phasor was measured in the system.

In FIG. 1 there are generally in such measurement providing devices 12, 14 and 16 each providing measurement phasors y1, y2 and yn of corresponding measurement quantities. The measurement providing devices are in this example all PMUs that provide measured phasors, time stamps the phasors and sends these in order for these phasors to be processed by a power control device 10. It should here be realized that there may be many more different measurement providing devices in the system in different geographical areas, where a geographical area normally corresponds to a separate group of machines swinging against a group of machines of another geographical area.

In FIG. 1 a first measurement providing device 12 is shown as sending a first measurement or phasor y1, typically a voltage phasor, a second measurement providing device 14 is shown as sending a second phasor y2 and an nth measurement providing device 16 is shown as sending an nth phasor yn. All these phasors y1, y2, yn are measured on-line and provided for the power control device 10. The phasors are thus obtained at distant geographical locations and time stamped by the measurement providing devices 12, 14 and 16, normally using a GPS clock, and sent via communication channels, which are potentially several thousand kilometers in length, to a measurement aligning device 18.

The measurement aligning device 18 may be a Phasor Data Concentrator (PDC) and receives the above-described measurement values and synchronizes them, i.e. packages the phasors with the same time stamp. It thus aligns the measured values with each other in time. These measurements do here form a set of actual measurement quantities that are sent to the power control device 10.

A measurement aligning device 18 is to listen to measurement providing devices that are sending time stamped phasors on a regular basis (e.g. every 20 ms). A conventional measurement aligning device 18 aligns the phasors according to the time stamp, expecting one measurement or phasor from each measurement providing device per time slot, and forwards all measurements in a set of actual measurement quantities when these corresponding to a given time slot are available. The measurement aligning device 18 in FIG. 1 has some further functionality, which will be described in more detail below. Because of this additional functionality the measurement aligning device 18 in FIG. 1 is an arrangement for enhancing reliability according to a first embodiment of the invention.

The measurement aligning device 18 provides the time aligned actual measurement values y1, y2, . . . yn or phasors of the actual measurement quantities to a wide area control unit of the power control device 10, which wide area control unit is here a power oscillation damping unit 28.

The power control device 10 may be realized in the form of a general power control system provided for an actuator, which may be a synchronous generator or a FACTS or HVDC installation. The power control device 10 here includes an actuator control unit 34 which provides an actuator control signal for the actuator. In this regard a modulation signal is generated in the power control device 10, which modulation signal is added to an actuator control signal generated by the actuator control unit 34 in order to counteract power oscillations. This modulation signal is here simply termed control signal CS. This control signal CS is thus generated by the wide area power oscillation damping unit 28 and supplied to the actuator control unit 34. The control signal CS is also provided to the measurement aligning device 18. The power control device 10 may also include time keeping circuitry, such as a GPS clock, for accurate timing. This is indicated by the power control device 10 being provided with an antenna.

The wide area power oscillation damping unit 28 may thus generate a control signal CS applied to an actuator control unit 34 for performing wide area control such as damping of inter-area power oscillations. How such damping may be performed is as such known in the art and will not be described in more detail here. It may as an example be performed using lead-lag compensation. In the power control device 10 the wide area power oscillation damping unit 28 is furthermore connected to a switchover unit 32, which switchover unit 32 is also connected to a local control unit, here in the form of a local power oscillation damping unit 30 as well as to the actuator control unit 34. The local power oscillation damping unit 30 is here provided in parallel with the wide area power oscillation damping unit 28. The wide area power oscillation damping unit 28 provides one feedback loop, while the local power oscillations damping unit 30 provides another feedback loop, where both loops are provided for closed-loop power oscillation damping (POD), which is the same as damping of electromechanical oscillations. The local feedback loop on the top of the figure corresponds to a standard configuration, where an input signal $y_L$ is a locally measured quantity e.g. power flow on a local transmission line or locally derived frequency. This local power oscillation damping unit 30 thus receives local measurements $y_L$ and provides a modulation signal determined based on these local measurements $y_L$, which modulation signal can be added to the control signal generated by the actuator control unit 34. Both the wide area power oscillation damping unit 28 and the local power oscillation damping unit 30 are therefore connected to the switchover unit 32, which passes on signals from either of these two units 28 and 30 to the actuator control unit 34 for performing power oscillation damping.

Figure 2:
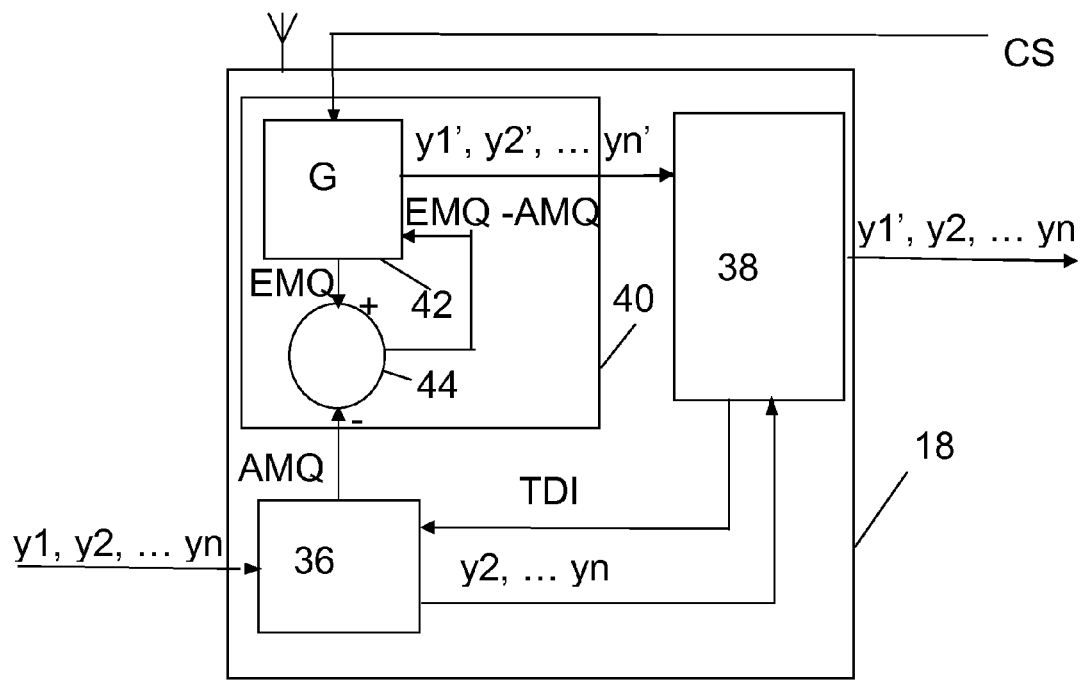
FIG. 2 shows a block schematic of the measurement aligning device forming the arrangement according to the first embodiment of the invention.

FIG. 2 schematically outlines one realization of the measurement aligning device 18 when acting as an arrangement according to the first embodiment of the invention. The measurement aligning device 18 includes a measurement aligning unit 36, which receives the actual measurements from the measurement providing devices. It is in turn connected to a control unit 38. The measurement aligning unit 36 supplies actual measurements, here exemplified by the measurements y2, . . . yn obtained from the second and the third measurement providing devices 14 and 16 to the control unit 38 and receives a time delay investigation signal TDI from this control unit 38. The measurement aligning device 18 also includes an estimating unit 40 comprising a measurement estimate providing element 42 and a subtracting element 44. The measurement estimate providing element 42 receives the control signal CS from the wide area power oscillation damping unit of the power control device and provides a set of estimated measurement values y1', y2', . . . yn' of a set of estimated measurement quantities EMQ based on a system model G. This set of estimated quantities EMQ is on the one hand provided to the subtracting element 44 and on the other hand to the control unit 38. The subtracting element 44 also receives the actual measurement values y1, y2, . . . , yn of the actual measurement quantities AMQ and provides the differences EMQ–AMQ between the two sets of quantities to the measurement estimate providing element 42. The measurement aligning device is also equipped with time keeping circuitry, such as a GPS clock, for accurate timing. This is indicated by the measurement aligning device being provided with an antenna.

The control unit 38 makes a selection of the values it receives from the measurement aligning unit 36 as well as from the estimating unit 40 and provides the wide area power oscillation damping unit in the power control device with the selected values. As an example it here provides a first estimated measurement value y1', a second actual measurement value y2 and an nth actual measurement value. How this selection is being performed will shortly be described in more detail.

The measurement aligning unit 36 may essentially be made of a number of buffers, one for each measurement providing device being connected.

Figure 3:
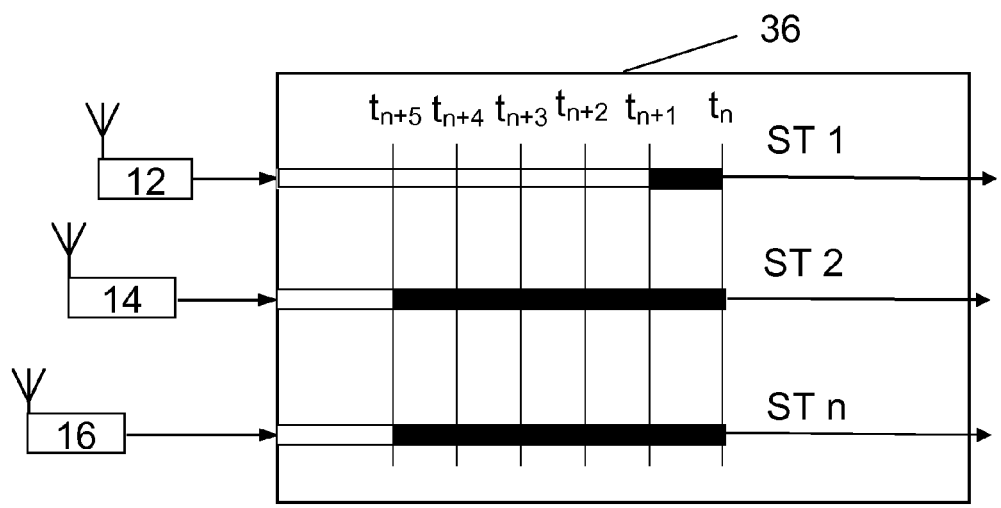
FIG. 3 shows the principal layout of a measurement aligning unit provided in the measurement aligning device in FIG. 2.

A block schematic of one such measurement aligning unit 36 is schematically shown in FIG. 3.

The measurement aligning unit 36 includes a number of stacks ST1, ST2, STn; one for each measurement providing device 12, 14 and 16, where measurements are stacked according to their time stamps or the time slots in which they are received. The measurements at the bottom of each stack are then the most recently received measurements and the measurements at the top of each stack are the measurements in line to be delivered next to the control unit 38. The top stack position is here provided to the right and the bottom stack position to the left in FIG. 3.

In the example given in FIG. 3 the actual measurement values of the first measurement providing device 12 are delayed in relation to the measurements from the other measurement providing devices 14 and 16 in the stacks ST 1, ST 2 and ST n. As the measurement aligning unit 36 normally would wait for all measurements corresponding to the same time slot to be received before they are forwarded, this means that the measurements from the second and the third measurement providing devices 14 and 16 are stacked up until the measurement with the same time stamp is received from the first measurement providing device 12. This is shown in FIG. 3 through the stacks ST 2 and ST n having measurements with time stamps corresponding to the times $t_n$, $t_{n+1}$, $t_{n+2}$, $t_{n+3}$ and $t_{n+4}$ in their stacks, while the stack ST 1 only has one measurement with a time stamp of $t_n$. Therefore if the measurements from the first measurement providing device 12 are delayed in relation to the measurements from the other measurement providing devices, there will be a time delay experienced in the system. The exemplifying time delay of FIG. 3 is here 4*Δt, where Δt is the length of a time slot, which may typically be 20 ms. It should here be realized that the actual delay shown is only selected for exemplifying the effect of a delay on a measurement aligning unit. An actual delay may be much longer than what is indicated in the figure.

This means that in a situation as described above for a conventional measurement aligning device, there will be a delay, exemplified through the delay of 4*Δt in FIG. 3, before actual measurements are forwarded from the measurement aligning device 36 to the wide area power oscillations damping unit in the power control device. If this delay is too long then it is impossible to perform wide area power oscillation damping and in this case local power oscillation damping has to be used instead.

FIG. 4 schematically shows data used in the system model G stored in and employed by the measurement estimation providing element 42 of the estimating unit 40.

In the first embodiment of the invention there is one control signal CS and a number of estimated measurement quantities EMQ1, EMQ2 and EMQn associated with the control signal. These quantities have values associated with pulses of the control signal at various instances in time. During operation of the measurement estimate providing element 42 there is stored a value $y'_{11}$ of a first estimated measurement quantity EMQ1 corresponding to measurements from the first measurement unit 12, a value $y'_{21}$ of a second estimated measurement quantity EMQ2 corresponding to measurements from the second measurement unit 14 and a value $y'_{n1}$ of an $n^{th}$ estimated measurement quantity EMQn corresponding to measurements from the $n^{th}$ measurement unit 16, where all these are associated with a first pulse $u_1$ of the control signal CS sent at a first time $t_1$. There is furthermore stored a value $y'_{12}$ of the first estimated measurement quantity EMQ1, a value $y'_{22}$ of the second estimated measurement quantity EMQ2 and a value $y'_{n2}$ of the $n^{th}$ estimated measurement quantity EMQn, where all these are associated with a second pulse $u_2$ of the control signal CS sent at a second time $t_2$. This continues until finally there is a last $m^{th}$ value $y'_{1m}$ of the first estimated measurement quantity EMQ1, a value $y'_{2m}$ of the second estimated measurement quantity EMQ2 and a value $y'_{nm}$ of the $n^{th}$ estimated measurement quantity EMQn, where all these are associated with a pulse $u_m$ and time $t_m$.

Figure 5:
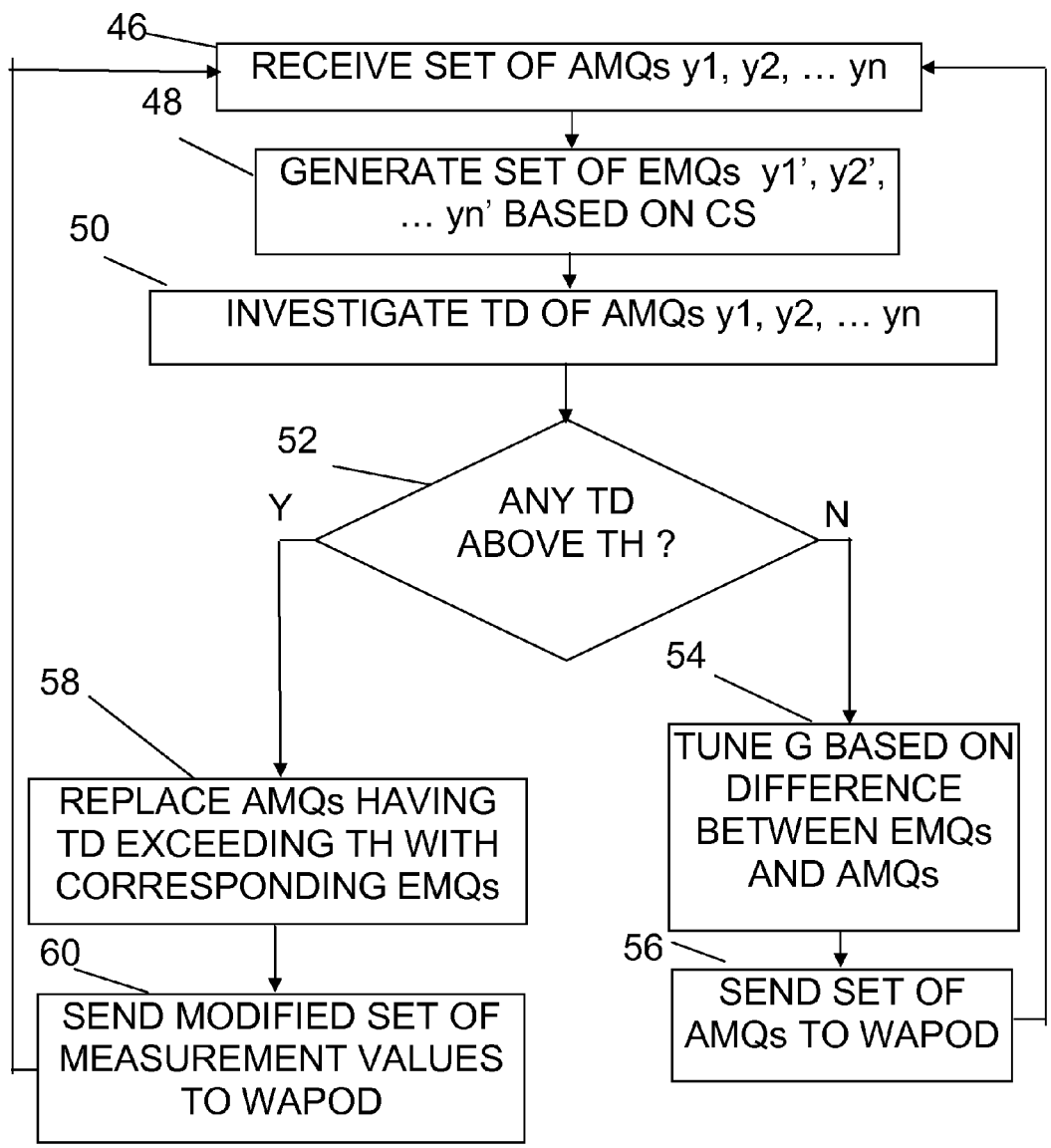
FIG. 5 shows a flow chart outlining a number of method steps of a method according to the first embodiment of the invention being performed in the measurement aligning device.

Now the functioning of the measurement aligning device 18, which is an arrangement for enhancing reliability according to the first embodiment of the invention, will be described with reference also being made to FIG. 5, which discloses a flow chart of a number of method steps being performed in the measurement aligning device.

The measurement providing devices 12, 14, 16 are used to obtain complex voltages and currents, i.e. phasors, based on measurements from remote locations all over the system. The measurement providing devices are provided with GPS clocks, i.e. they have time keeping circuitry being in contact with reference clock devices in the form of GPS satellites 20, 22, 24 and 26 in order to provide accurate timing. For this reason all measurement providing devices 12, 14 and 16 are provided with antennas, where each antenna may listen to a number 'm' of satellites. These measurements then get time stamped by the time keeping circuitry. Data (in the form of phasors) y1, y2, yn from all the measurement providing devices 12, 14, 16 are then transmitted to the measurement aligning device 18, which may thus be a central phasor data concentrator (PDC). This data makes up a set of actual measurement values of a set of actual measurement quantities AMQ. The measurement aligning device 18 is here separated from the power control device 10. However, it should be realized that as an alternative the measurement aligning device may be included as a unit in the power control device 10. This measurement aligning device 18 is responsible for synchronizing the data received from all the measurement providing devices 12, 14, 16. Synchronized data is then delivered to the power control device 10 and more particularly to the wide area power oscillation damping unit 28, which generates a control signal CS used for providing power oscillation damping by the actuator control unit 34. This control signal CS is also provided from the wide area power oscillation damping unit 28 to the measurement estimate providing element 42 of the estimating unit 40. The control signal may here be time stamped in the measurement aligning device, for instance by the measurement providing element 42, in order to be aligned and used with actual measurement values. As an alternative it is possible that the control signal is time stamped by the power control device, where it is possible that the wide area power oscillation damping unit controls this time stamping.

According to this first embodiment of the invention the set of actual measurement values y1, y2, yn is also received in the measurement aligning unit 36, step 46, where, in normal operation, the values of this set are buffered in the respective buffers ST1, ST2 and ST n until all having the same time stamp have been received. In parallel with this reception of actual measurement values, the measurement estimating unit 40 provides corresponding estimated measurement values y1', y2' and yn based on the control signal CS, step 48. Initially this control signal may be zero, which is the case when no damping is performed.

The estimation is made through using an equivalent dynamic model G of the power transmission system and applying the control signal CS in this model.

The model here provides a transfer function according to $G=\hat{y}'/\hat{u}$, where G is a matrix including a number of transfer functions, $\hat{y}'$ is a vector of estimated measurement values and $\hat{u}$ is a vector of control signal values.

The control signal CS is applied in a set of system equations provided through the model G of the power transmission system. This is done through using a number q of states x, which number q may as an example be 50. The equations are provided in a state space that is dependent on the number of states. The equations can here be non-linear equations or linear equations, which define the relationship between values of estimated measurement quantities, states of the system and the pulses of the control signal. The functions thus identify relationships between system states, control signal values and estimated measurement values. The values of several different estimated measurement quantities and several different control signals may then be entered into these equations.

If there are n outputs or estimated quantities, q states and p inputs or control signals, then the equations may be generally expressed as:

$$\hat{x}_{k+1}=F_1(\hat{x}_k)+F_2(\hat{u}_k) \quad (1)$$

$$\hat{y}_{k+1}'=F_3(\hat{x}_k)+F_4(\hat{u}_k) \quad (2)$$

where k is a current instance in time being examined $y_{k+1}'$ is an estimated measurement value vector with size n at an instance in time k+1, $\hat{x}_k$ is state vector of size q at the instance in time k, $\hat{x}_{k+1}$ is a predicted state vector of size q at the instance in time k+1, $\hat{u}_k$ is a control signal pulse vector of size p, $F_1(\hat{x}_k)$ and $F_3(\hat{x}_k)$ are matrices of size q×q and n×q, respectively, including functions of the states x at the instance in time k while $F_2(\hat{u}_k)$ and $F_4(\hat{u}_k)$ are matrices of size n×q and n×p with functions of control signal pulses u at the instance in time k. Here the functions of these matrices can be non-linear but also linear.

In the first embodiment p=1, which actually makes the control signal pulse vector $\hat{u}_k$ into a variable and the matrices $F_2(\hat{u}_k)$ and $F_4(\hat{u}_k)$ into vectors. It can therefore be seen that in this special case the equations define a single input multiple output (SIMO) system.

If the functions are linear, the equations can furthermore be simplified as:

$$\hat{x}_{k+1}A*\hat{x}_k+B*\hat{u}_k \quad (3)$$

$$\hat{y}_{k+1}'=C*\hat{x}_k+D*\hat{u}_k \quad (4)$$

where A, B, C and D are matrices with desirable system constants of the model. In the first embodiment of the invention B and D are actually vectors.

It can thus be seen that the estimated measurement values at a specific point in time are obtained based on states and a control signal pulse of a preceding point in time.

The pulses u of the control signal CS are here entered into theses equations for each time k, and at each following point in time k+1, there is generated a set of estimated measurement values y2' and yn", which are provided to the control unit 38. They are furthermore also provided to the subtracting unit 44.

The control unit 38 furthermore investigates of one or more of the deviation conditions associated with at least one actual measurement value is fulfilled. This investigation of a deviation condition here involves the investigation of the time delays TD of the actual measurement values in the measurement aligning unit, step 50. This investigation may be performed if the actual measurement values have not been received by the control unit for a certain amount of time. In one variation of the invention, this may involve investigating the time stamp of the actual measurements at the top of the stacks ST1, ST2, . . . STn. This investigation may be performed through the control unit 38 sending a time delay investigation signal TDI to the measurement aligning unit 36, which replies with the time stamps of the values at the top of the stacks. These time stamps may then be compared with a threshold TH by the control unit, and in case the time stamps of the top position of the stacks exceed this threshold TH, then this particular deviation condition is fulfilled because at least some of the actual measurements have a time delay exceeding the threshold TH, step 52. It is also possible that the control unit compares the time that has lapsed since the last set of actual measurement values was received from the measurement aligning unit and directly orders the measurement aligning unit to forward the oldest of these measurements if this time delay exceeds a time delay threshold. It is furthermore possible that the measurement aligning unit itself compares the time stamp of the top of the stacks with a threshold and either informs the control unit about the delay, in which case the control unit may order the measurement aligning unit to send the measurements at the top of the stacks, or that the measurement aligning unit itself forwards an incomplete set of actual measurement value. In this latter case this forwarding could be accompanied by an indication that not all measurement values are present and also which ones are missing. The control unit can also find that out itself by investigating the actual measurement values it does receive. This investigation may be performed by a deviation condition investigating element, which element may thus be provided in the control unit, in the measurement aligning unit or in both. The deviation condition investigating element would therefore, in relation to the deviation condition related to the aspect of delay, investigate the time delay of the actual measurement values of the set through the power transmission system, where the time delay would at least depend on and in this case also be made up of the difference between the time of generation of an actual measurement value and the time at which this actual measurement value is received by the measurement alignment unit 36 and then compare this delay with a threshold. The delay would depend on this difference in case the investigation were made later, for instance in the power control device.

In case the delay is below the threshold TH, then the deviation condition is not fulfilled and the model G is tuned using the difference between the estimated measurement quantities EMQ and the actual measurement quantities AMQ, step 54. This means that measurement values that have been estimated for a pulse of a control signal generated at a certain point in time are compared with actual measurement values having time stamps indicating the same point in time. A difference is furthermore formed between an actual measurement value received from a measurement providing device and an estimated value that is an estimation of this particular actual measurement. The comparison may furthermore be performed through the measurement estimate providing element 42 providing the estimated quantities EMQ to the subtracting element 44 and the measurement aligning unit 38 providing the corresponding actual measurement quantities AMQ to the subtracting element 44. The quantities are then subtracted from each other in this subtracting element 44 and the difference provided to the measurement estimate providing element 42. Thereafter the model G is tuned. This may be done through changing the coefficients of the above mentioned equations for minimising the differences between actual and estimated values of the quantities. This means that the coefficients of the space state model that characterises the power transmission system are tuned as wide area control is performed. In this way a stable set of coefficients are obtained.

The complete set of actual measurement values, i.e. including all the measurement values of the set, is in this case also received by the control unit 38 from the measurement aligning unit 38 and sent to the wide area power oscillation damping unit 28 of the power control device 10, step 56, which continues and generates a new pulse of the control signal CS, which pulse is provided to the actuator control unit 34 and the measurement estimation providing element 42, which performs a new estimation of the measured quantities that are forwarded to the control unit 38, while the corresponding actual measurements are received by the measurement aligning unit 36, followed by a new investigation of the time delay.

If however the threshold TH is exceeded, step 52, i.e. the delay is above the threshold, then the deviation condition is fulfilled and the control unit 38 orders the measurement aligning unit 36 to forward all the actual measurement values it has received for the time stamp in question, i.e., an incomplete set of measurement values. As an example the measurement aligning unit 36 here forwards the second and the nth actual measurement y2 and yn. The actual measurements that are not present in the measurement aligning unit, i.e. the ones that have not been received, are replaced with a corresponding estimated measurement value by the control unit 38. This means that actual measurement values that have a time delay TD exceeding the threshold TH are replaced with corresponding estimated measurement values. In the present example the first measurement value y1 has such a delay and therefore it is replaced by the corresponding value y1' that has been estimated for it. Thereafter the control unit 38 forwards this modified set of measurement values to the wide area power oscillation damping unit 28 in the power control device 10, which goes on and generates a control signal pulse based on these values.

Thereafter the measurements are again received and investigations performed for the next following time stamp. This then continues for as long as actual measurements are delayed. As long as at least one measurement value is delayed, the system model is not tuned. The tuning is thus frozen for as long as there is a delay. If measurements are then again received in time, normal operation may thereafter resume. In this way delayed measurements are replaced by estimated measurements and wide area power oscillation damping can continue despite this delay. There is no need to switch-over to local power oscillation damping or to abort power oscillation damping.

The measurements are received at a first rate, which first rate is normally decided by the sampling rate of the measurement providing devices. This first rate may typically be that a sample is received every 20 ms. The tuning is made at a second rate. This second rate may be the same as the first rate. However, it is also possible that it differs. In this first embodiment this second rate is lower than the first rate. In this first embodiment of the invention the first rate is furthermore ten times higher than the second rate. This means that in this first embodiment the model is tuned once every 200 ms. However, other relationships are of course possible.

More information about the provision of a model and the tuning of it can be found in the article "Towards Real-time Implementation of Adaptive Damping Controllers for FACTS Devices" by P. Korba, M. Larsson, B. Chaudhuri, B. Pal, R. Majumder, R. Sadikovic and G. Andersson in IEEE Power Engineering Society General Meeting, 2007, which is herein incorporated by reference.

The power control device 10 described in relation to the first embodiment of the invention includes switchover logic for enabling a switch-over to local power osculation damping. Such a switchover may be performed if for instance all measurements or a majority of measurements of the set of measurement values are lost or if the values of a measured quantity are delayed for a long period of time. It should however be realized that it is possible to implement the present invention without such local power oscillation damping and consequently without a switchover unit.

The system described above was a SIMO system. It should be realized that it can be applied on a MIMO system. Such a situation is the case in a second embodiment of the invention.

Figure 6:
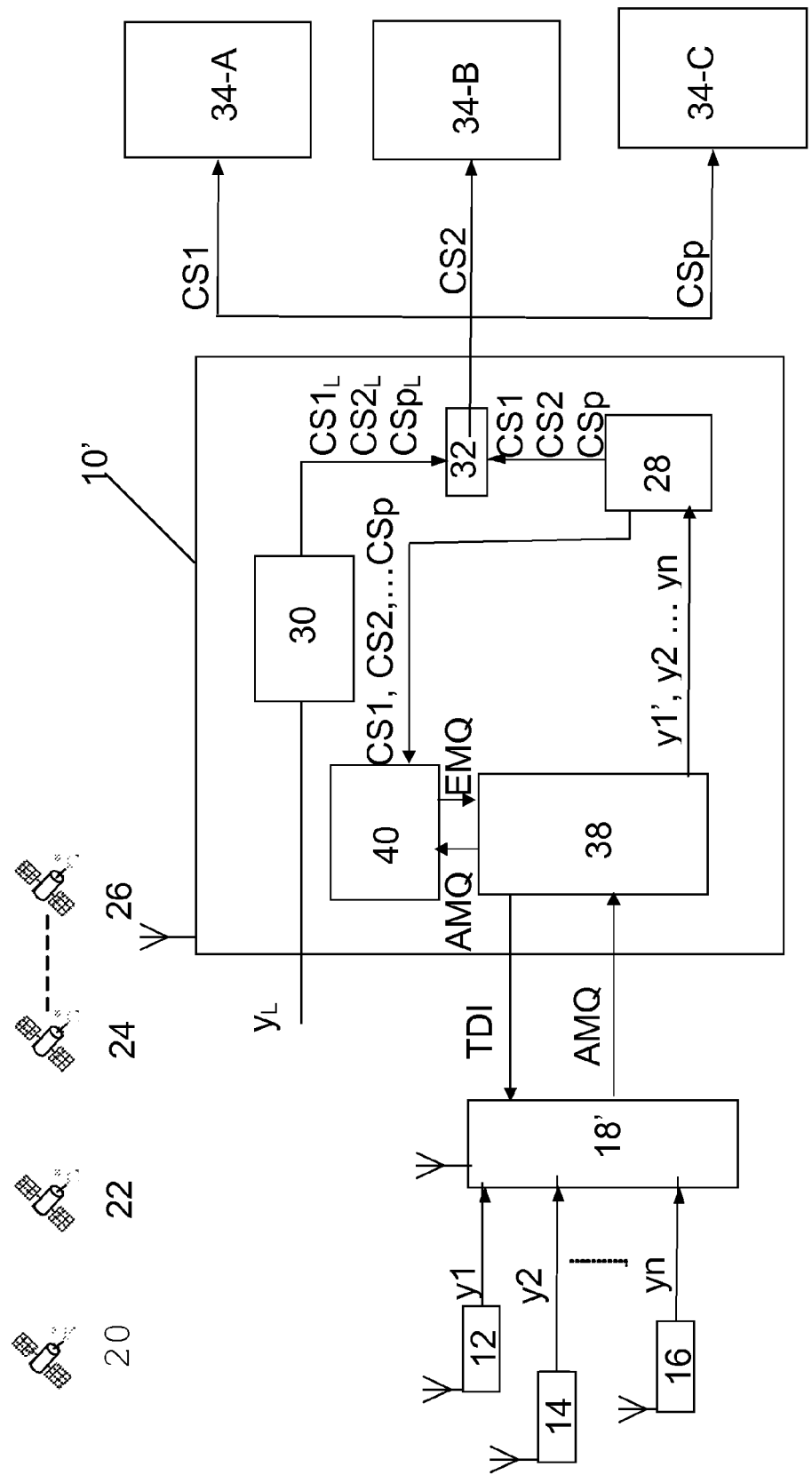
FIG. 6 schematically shows a number of measurement providing devices in a power transmission system being connected to a power control device via a measurement aligning device, where the power control device is an arrangement for enhancing reliability according to a second embodiment of the invention.

FIG. 6 schematically shows a system according to this variation of the invention. Most of the devices are the same as in FIG. 1 and also include the same units. However, there are some differences in FIG. 6.

In the system in FIG. 6 an arrangement for enhancing reliability according to the second embodiment of the invention is provided through a power control device 10', which includes the wide and local area control units 28 and 30 and switchover unit 32 as in the first embodiment. However, in this second embodiment the power control device 10' also includes the control unit 38 and estimating unit 40. There is also a measurement aligning device 18' that is essentially a conventional PDC, i.e. a measurement aligning device essentially only including a measurement aligning unit. There is one major difference though. It may be possible to order this measurement aligning device to submit measurements associated with a certain time stamp if a time delay threshold is exceeded even though it does not have all such measurements. The measurement aligning device 18' may as an alternative be configured to perform this activity itself. When receiving such an order or when submitting measurements in this way by on its own motion, the measurement aligning device 18' will forward the actual measurements at the top of the stacks of the measurement aligning unit, i.e. the oldest that it has.

In the system there are, as before, a number of measurement providing devices 12, 14 and 16 receiving accurate timing from satellites 20, 22, 24 and 26 and communicating with the measurement aligning device 18, in the same way as in the first embodiment. The measurement aligning device 18' is also communicating with the power control device 10' that forms the arrangement according to the second embodiment of the invention. As mentioned above, the arrangement 10' according to this second embodiment includes, apart from the above mentioned control unit and estimating unit 40, a wide area power oscillation damping unit 28, switchover unit 32 and local power oscillation damping unit 30. However it does not include any actuator control unit. Instead the switchover unit 28 communicates with a first, second and p$^{th}$ actuator control unit 34-A, 34-B and 34-C, each being associated with a separate actuator in the system. Here the wide area power oscillation damping unit 28 provides wide area control signals CS1, CS2 and CSp intended for actuator control units 34-A, 34-B and 34-C, respectively.

In this case the wide area power oscillation damping unit 28 will send out control signals CS1, CS2, . . . CSp to the actuators controlled by actuator control units 34-A, 34-B and 34-C. As can be seen in FIG. 6, the control signals CS1, CS2 and CSp are thus sent from the same positions in the power transmission system from where power oscillation damping control is performed by the power oscillation damping control unit 28. In this variation of the invention the estimating unit 40 determines the estimated measurement quantities EMQ1, EMQ2 . . . EMQn and tunes the model in the same way as in the first embodiment. However, here the estimated quantities are dependent on multiple control signals CS1, CS2, . . . CSp. This can be seen in FIG. 7, which shows the control signals CS1, CS2, . . . CSp. and the estimated quantities EMQ1, EMQ2 . . . EMQn.

In this second embodiment the estimating unit applies the system equations in the more general form described above. The equations in this case therefore define a multiple input multiple output (MIMO) system. Thus the second embodiment of the invention allows continued use wide area power oscillation damping when one or more actual measurements are delayed or lost also in a multiple actuator environment.

The invention has a number of advantages. It allows continued use of wide area power oscillation camping even though one or more actual measurement values have delays that would normally cause a switch-over to local power oscillation damping. This therefore increases the reliability of such wide area power oscillation damping. Since a model is used that may closely resemble the actual system, it is furthermore possible that the control performed will be very close to normal. This can furthermore be done with only a slight modification of the devices involved, mainly through a change of software.

There are a number of variations that can be made on the present invention. In the described embodiments, the tuning of the model was stopped once there was a delay exceeding the threshold. It is possible to continue to tune the model. It is of course also possible that more than one measurement value is delayed, in which case all delayed measurement values are replaced with estimated values. It is furthermore possible that once one of the measurement values of the set is delayed, then all measurement values of the set are replaced by an estimated value. It is furthermore possible to replace a group of actual measurement values appearing in the set if one value of the group is delayed. This group may then be associated with a certain geographical area of the power transmission system.

It is furthermore of course also possible to adapt the first embodiment of the invention for use with several control signals as well as to adapt the second embodiment of the invention for use with only one control signal. It is also possible to separate the control unit and the estimating unit and place them in different devices. One may for instance be placed in the measurement aligning device and the other in the power control device. These units do furthermore not have to be provided in these devices at all, but can be provided as one or two separate devices.

The invention was above furthermore described in relation to delays. Delay is merely one aspect of an actual measurement for which a replacement may be made in case a deviation condition of this aspect is fulfilled. It should be realized that the invention may be used in relation to other aspects of measurement values, such as them being faulty like having a wrong periodicity or a wrong value range, such as, the timing used in the measurement providing devices being unreliable, for instance because of a lack of contact between measurement providing device and GPS satellite or a measurement values being lost altogether.

The arrangement according to the invention may with advantage be provided in the form of one or more processors together with an internal memory including computer program code in one or more computers, which code when being operated on by the processor performs the above mentioned arrangement functionality. It will thus be apparent to the skilled man that the arrangement of the present invention may be hardwired, such as provided in the form of discrete components as indicated in FIG. 2, or implemented as a computer program. Such a computer program may also be provided on a computer program product, such as one or more data carriers, like memory sticks or CD ROM disks, carrying the above mentioned computer program code.

As indicated above the arrangement may be provided on a wide-area monitoring and control platform or on a PDC.

The arrangement of the present invention may thus be run in a control system for power electronics actuators e.g. FACTS, HVDC, PSS, generator excitation systems etc.

Whilst the foregoing description of the invention describes a system for power oscillation damping, the skilled person will be aware that further embodiments may be envisaged where power oscillation damping is not involved. Specifically, control schemes for remote voltage control and/or control schemes for avoiding loss of synchronism. Therefore the present invention is only to be limited by the following claims.

What is claimed is:

1. A method for enhancing the reliability of wide area control in a power transmission system, said system comprising a wide area control unit that is provided with actual measurement values of system data for performing wide area control in said power transmission system based on the actual measurement values of system data, the method comprising the steps of:
    obtaining a set of actual measurement values from measurements made in the power transmission system,
    generating estimated measurement values corresponding to the actual measurement values of the set based on at least one control signal being sent into said system and a model of the system,
    if one or more deviation condition associated with at least one actual measurement value is fulfilled, replacing at least the actual measurement values of the set being associated with said one or more deviation condition with corresponding estimated measurement values for obtaining a modified set of measurement values, and sending the modified set of measurement values to the wide area control unit.

2. The method according to claim 1, further comprising the step of tuning the system model.

3. The method according to claim 2, wherein the step of tuning is only performed when no deviation condition is fulfilled.

4. The method according to claim 2, wherein the actual measurement values are obtained at a first rate and the system model is tuned at a second lower rate.

5. The method according to claim 4, wherein the first rate is at ten times higher than the second rate.

6. The method according to claim 1, wherein one deviation condition is fulfilled for an actual measurement value if it has a time delay through the system that exceeds a time delay threshold.

7. The method according to claim 6, wherein said time delay at least depends on the difference between the time of generation of the actual measurement value and the time at which the actual measurement value is received by a measurement aligning unit of the system.

8. The method according to claim 1, further comprising the step of investigating if any deviation condition associated with the actual measurement values of the set is fulfilled.

9. The method according to claim 1, wherein the model includes a set of equations including functions identifying relationships between system states, control signals and estimated measurement values.

10. The method according to claim 9, wherein the functions are linear or non-linear functions.

11. An arrangement for enhancing the reliability of wide area control in a power transmission system, said system comprising a wide area control unit that is provided with actual measurement values of system data for performing wide area control in said power transmission system based on the actual measurement values of system data the device further comprising:
    an estimating unit configured to generate estimated measurement values based on at least one control signal being sent into said system and a model of the system, said estimated measurement values corresponding to a set of actual measurement values having been obtained from a number of measurement providing devices in the system, and
    a control unit configured to replace, if one or more deviation condition associated with at least one actual measurement value is fulfilled, at least the actual measurement values of the set being associated with said one or more deviation condition with corresponding estimated measurement values for obtaining a modified set of measurement values and send the modified set of measurement values to the wide area control unit.

12. The arrangement according to claim 11, wherein the estimating unit is further configured to tune the system model.

13. The arrangement according to claim 12, wherein the estimating unit is configured to only perform tuning when no deviation condition is fulfilled.

14. The arrangement according to claim 11, wherein the actual measurement values are provided by the measurement providing devices at a first rate and the estimating unit is configured to tune the system model at a second lower rate.

15. The arrangement according to claim 11, further comprising a deviation condition investigating element configured to investigate if any deviation condition associated with the measurement values of the set is fulfilled.

16. The arrangement according to claim 11, wherein the deviation condition investigating element is configured to investigate the time delay of the actual measurement values through the system and to determine that a deviation condition exists if at least one actual measurement value has a time delay that exceeds a time delay threshold.

17. A computer program for enhancing the reliability of wide area control in a power transmission system, said system comprising a wide area control unit that is provided with actual measurement values of system data for performing wide area control in said power transmission system based on the actual measurement values of system data, the computer program being loadable into one or more internal memory of one or more computer and comprises computer program code means to make said one or more computer, when said program is loaded in said one or more internal memory,
    obtain a set of actual measurement values from measurements made in the power transmission system,
    generate estimated measurement values based on at least one control signal being sent into said system and a model of the system, said estimated measurement values corresponding to a set of actual measurement values that are provided by a number of measurement providing devices in the system, and replace, if one or more deviation condition associated with at least one actual measurement value is fulfilled, at least the actual measurement values of the set being associated with said one or more deviation condition with corresponding estimated measurement values or obtaining a modified set of measurement values, and send the modified set of measurement values to the wide area control unit.

* * * * *